United States Patent
Peng

(10) Patent No.: US 12,380,918 B1
(45) Date of Patent: Aug. 5, 2025

(54) ENERGY-ASSISTED RECORDING HEAD WITH C-SHAPED DELIVERY WAVEGUIDE CORE

(71) Applicant: SEAGATE TECHNOLOGY LLC, Fremont, CA (US)

(72) Inventor: Chubing Peng, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/442,380

(22) Filed: Feb. 15, 2024

(51) Int. Cl.
*G11B 5/00* (2006.01)
*G11B 5/147* (2006.01)

(52) U.S. Cl.
CPC .... *G11B 5/1475* (2013.01); *G11B 2005/0021* (2013.01)

(58) Field of Classification Search
CPC .. G11B 5/54; G11B 5/58; G11B 5/314; G11B 5/4866; G11B 5/6088; G11B 7/1387; G11B 2005/0021

USPC .......................................................... 360/59
See application file for complete search history.

(56) References Cited

U.S. PATENT DOCUMENTS

| | | | |
|---|---|---|---|
| 6,999,384 B2 | 2/2006 | Stancil | |
| 7,773,330 B2 | 8/2010 | Itagi | |
| 9,558,770 B2 | 1/2017 | Yang | |
| 10,186,292 B1* | 1/2019 | Krishnamurthy | .... G11B 5/6082 |
| 10,403,313 B1 | 9/2019 | Gan | |
| 2010/0165802 A1 | 7/2010 | Stipe | |

* cited by examiner

*Primary Examiner* — Nabil Z Hindi
(74) *Attorney, Agent, or Firm* — Mueting Raasch Group

(57) ABSTRACT

A recording head includes a near-field transducer proximate a media-facing surface of the recording head. A light delivery waveguide extends from an energy source to the near-field transducer. The light delivery waveguide includes, proximate the near-field transducer, a C-shaped core of a first dielectric material. The C-shaped core has a hollow aligned with the near-field transducer. A cladding of a second dielectric material surrounds the C-shaped core.

19 Claims, 11 Drawing Sheets

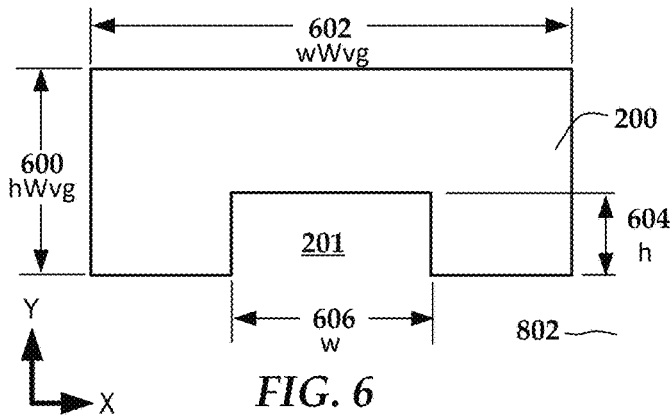
*FIG. 6*
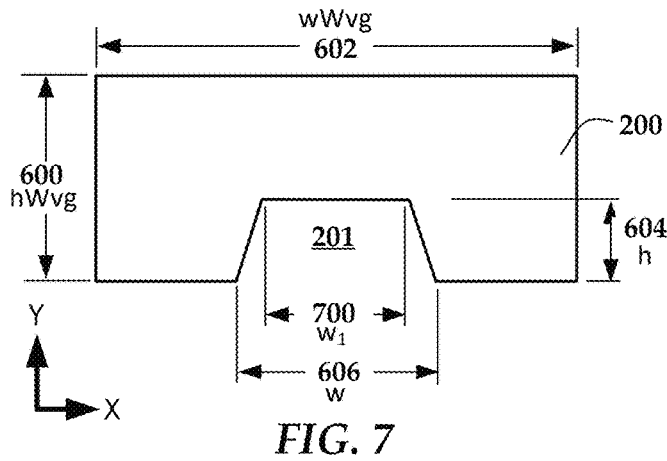
*FIG. 7*
| | hWvg (nm) | w/w₁/h (nm) | WPE (nm) | DT-TG (K/nm) | Analytic ADC | pegT (K) | SDSC_T (K) | Pole_T (K) | mSIM_T (K) | CPI (mW) | Pabs (mW) |
|---|---|---|---|---|---|---|---|---|---|---|---|
| Baseline | 120 | | 24.573 | 11.83 | 2.1021 | 264.19 | 120.04 | 76.08 | 76.57 | 4.336 | 3.697 |
| C-shape Rectangular | 130 | 250/250/50 | 24.526 | 11.89 | 2.1073 (+0.25%) | 258.33 (-6) | 112.86 (-7;-6%) | 68.27 (-8;-10%) | 67.33 (-9) | 3.595 (-17.6%) | 3.077 (-16.7%) |
| | 125 | 250/250/40 | 24.534 | 11.88 | 2.1066 (+0.2%) | 258.16 (-6) | 112.72 (-7;-6%) | 68.18 (-8;-10%) | 67.25 (-9) | 3.576 (-18.1%) | 3.067 (-17%) |
| C-shape Trapezoidal | 130 | 300/200/50 | 24.522 | 11.87 | 2.1064 (+0.2%) | 258.55 (-5) | 113.05 (-7;-6%) | 68.31 (-8;-10%) | 67.25 (-9) | 3.584 (-17.91%) | 3.066 (-17.1%) |
*FIG. 8*

Light wavelength = 1500 nm

| | hWvg (nm) | w/h (nm) | WPE (nm) | DT-TG (K/nm) | Analytic ADC | pegT (K) | SDSC_T (K) | Pole_T (K) | mSIM_T (K) | CPI (mW) | Pabs (mW) |
|---|---|---|---|---|---|---|---|---|---|---|---|
| Baseline | 210 | | 20.844 | 14.15 | 2.311 | 126.58 | 56.24 | 42.57 | 34.28 | 4.336 | 3.697 |
| C-shape Rectangular | 220 | 250/50 | 20.844 | 14.151 | 2.311 | 126.52 | 56.26 | 42.68 | 34.3 | 2.34 (-4.5%) | 1.647 (-1.9%) |
| | 220 | 300/40 | 20.85 | 14.16 | 2.311 | 126.87 | 56.25 | 42.62 | 34.21 | 2.34 (-4.5%) | 1.642 (-2.2%) |

ENERGY-ASSISTED RECORDING HEAD WITH C-SHAPED DELIVERY WAVEGUIDE CORE

SUMMARY

The present disclosure is directed to an energy-assisted recording head having a C-shaped delivery waveguide. In one embodiment, a recording head includes a near-field transducer proximate a media-facing surface of the recording head. The near-field transducer includes a plate-like, enlarged part with a peg extending from the enlarged part. A light delivery waveguide extends from an energy source to the near-field transducer. The light delivery waveguide includes, proximate the near-field transducer, a C-shaped core of a first dielectric material. The C-shaped core has a hollow aligned with the near-field transducer. A cladding of a second dielectric material surrounds the C-shaped core.

In another embodiment, a recording head includes a near-field transducer proximate a media-facing surface of the recording head. The near-field transducer shapes and directs surface plasmons to a recording medium. A light delivery waveguide extends from an energy source to the near-field transducer. The light delivery waveguide has a C-shaped core of a first dielectric material. The core has a hollow aligned with the near-field transducer and facing away from the near-field transducer. The waveguide further includes a cladding of a second dielectric material that surrounds the C-shaped core.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIGS. 6 and 7 are cross-sectional views of waveguide cores according to example embodiments;

FIG. 8 is a table showing simulation results for a recording head according to example embodiments;

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

In one or more embodiments, a HAMR write transducer uses a plate-type NFT with an enlarged part that collects optical energy being directed on it by adjacent reflectors. The NFT is shaped with a peg directed toward the recording medium, and energy in the form of surface plasmons is directed towards the peg where it is shaped and directed to heat the recording medium. Other NFT shapes may achieve this shaping and directing of surface plasmons, e.g., a pin-shaped NFT, sometimes referred to as a nanorod. The NFT may have other features such as heat sinks, sunken plates, etc., which helps ensure desired performance and longevity of the NFT.

One way to achieve-higher areal density capacity (ADC) for disk storage is to decrease the size of the optical hotspot created by the NFT on the media. This can be achieved by decreasing the size of the NFT, as well as adding other features, such as reflectors, to concentrate the energy. Other characteristics besides the size of the spot are indicative as to whether a particular design will achieve ADC goals. For example, thermal gradient is a measure of the change in temperature induced in the media at the edges of the hotspot. Generally, a hotspot with a high thermal gradient will have more sharply defined edges compared to a spot with a lower thermal gradient. Increasing thermal gradient can help ensure that the written bits are more reliably read back after being written.

Generally, a HAMR design with good NFT coupling efficiency (CE) can achieve desired goals of increased ADC, reliable data recording, and longevity of the recording head components. Improvements to the CE have largely focused on the NFT design and its surrounding components such as subwavelength mirrors. In the present disclosure, the interaction between the NFT and light delivery waveguide are examined and features are described that can improve CE for various different recording head configurations. In embodiments described below, a delivery waveguide is described that can improve coupling efficiency proximate the NFT. The waveguide can be readily manufactured using existing wafer fabrication processes, and can result in improved HAMR performance.

Figure 1:
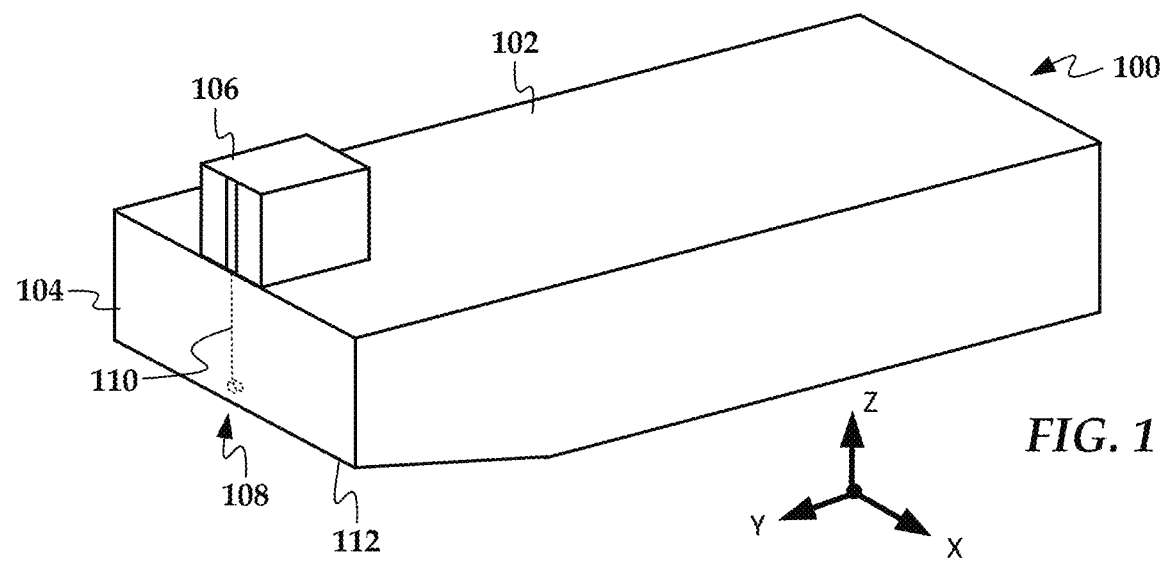
FIG. 1 is a perspective view of a read/write head assembly according to an example embodiment.

In reference now to FIG. 1, a perspective view shows a read/write head 100 according to an example embodiment. The read/write head 100 is used in a magnetic data storage device, e.g., HAMR hard disk drive. The read/write head 100 may also be referred to herein interchangeably as a slider, head, write head, read head, and recording head. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 2:
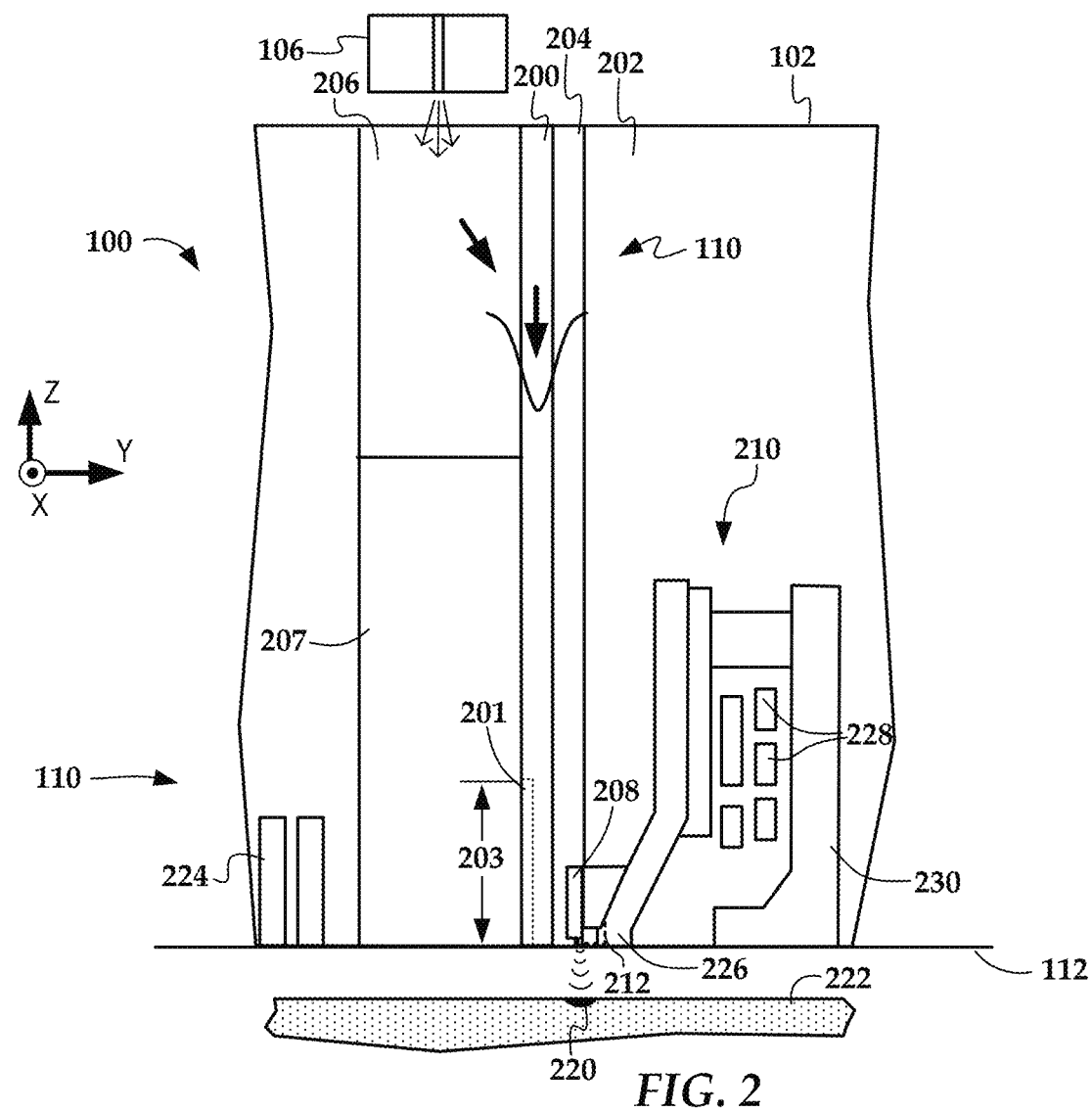
FIG. 2 is a cross-sectional view of a read/write head along a down-track plane according to according to an example embodiment.
Figure 3:
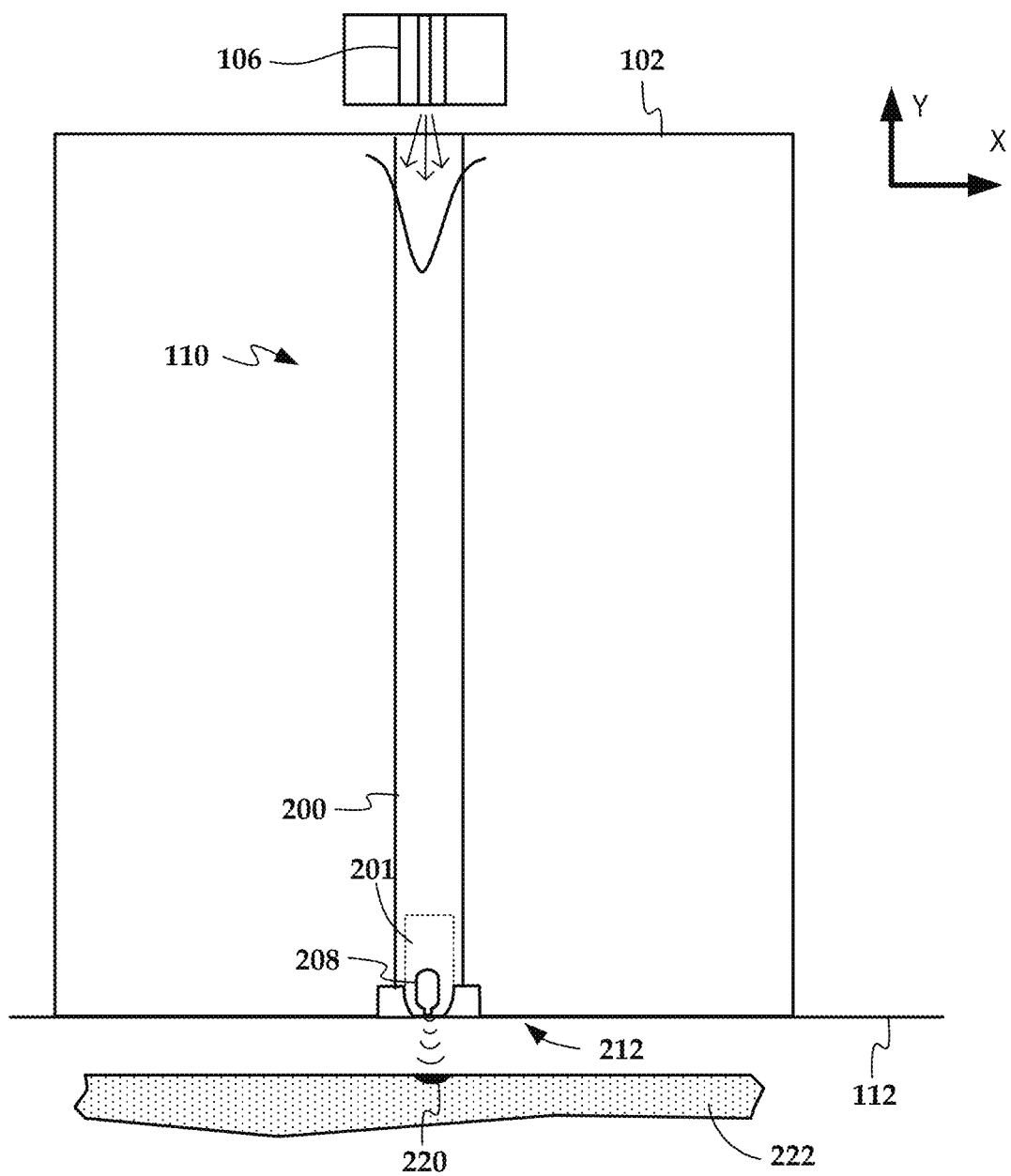
FIG. 3 is a cross-sectional view of a head along a substrate-parallel plane according to according to an example embodiment

In FIGS. 2 and 3, respective cross-sectional and wafer plane views of the slider body 102 show a light delivery system according to an example embodiment. The slider body includes an NFT 208, a magnetic writer 210 and a mirror assembly 212, sometimes referred to as a subwavelength mirrors, subwavelength focusing mirrors, subwavelength solid immersion mirrors (SIMs), mini-SIMs, mSIMs, etc. Light, emitting from the laser diode 106, is coupled into a three-dimensional, single mode channel waveguide 110 by a waveguide input coupler 206, which directs the light to a waveguide core 200. The input coupler 206 is replaced by a bottom cladding layer 207 towards the media-facing surface 112. Note that other waveguide and input coupler arrangements may be used with the NFT 208 and mirror assembly 212.

The NFT 208 has a plate-like, enlarged part with two curved ends and a protruded peg. Other shapes may be possible for the enlarged part of the NFT 208, e.g., rectangular, triangular. The NFT 208 is placed proximate a side cladding layer 204 and top cladding layer 202 of the waveguide 110 and near the waveguide core 200. The NFT 208 could be also placed into the waveguide core 200. The NFT 208 achieves plasmonic resonance in response to the light coupled via the waveguide 110 and creates a small hotspot 220 on a surface of a recording medium 222 (e.g., magnetic disk) during recording.

The waveguide core 200 includes a hollow 201 proximate and facing away from the NFT 208. The hollow 201 results in the waveguide core 200 having a C-shaped cross section near the NFT. 208. The cross-section resulting from the hollow 201 may alternately be referred to as U-shaped, C-channel, U-channel, etc. The hollow 201 may be alternately referred to as a channel, trench, cut-out, or the like. In this example, the hollow 201 extends a distance 203 away from the media-facing surface 112, e.g., at least large enough to form the desired waveguide mode. Depending on the optical characteristics of the waveguide, this distance 203 may be on the order of tens of micrometers, e.g., less than 100 micrometers. The hollow 201 is aligned with the NFT 208, e.g., centered with respect to each other in the crosstrack direction.

The NFT 208 is proximate a write pole 226 of the writer 210. The writer 210 includes coils 228 that induce a magnetic flux through the write pole 226. A flux path is created between the write pole 226 and a return pole 230 of the writer 210. There may be more than one return pole, e.g., on a side of the NFT 208 facing the reader.

A magnetic reader 224 is shown down-track from the NFT 208 and magnetic writer 210. The magnetic reader 224 may include a magneto-resistive stack that changes resistance in response to changes in magnetic field detected from the recording medium 222. These changes in magnetic field are converted to data by a read channel of an apparatus that houses the head 100 and recording medium 222 (e.g., hard disk drive assembly).

Figure 4:
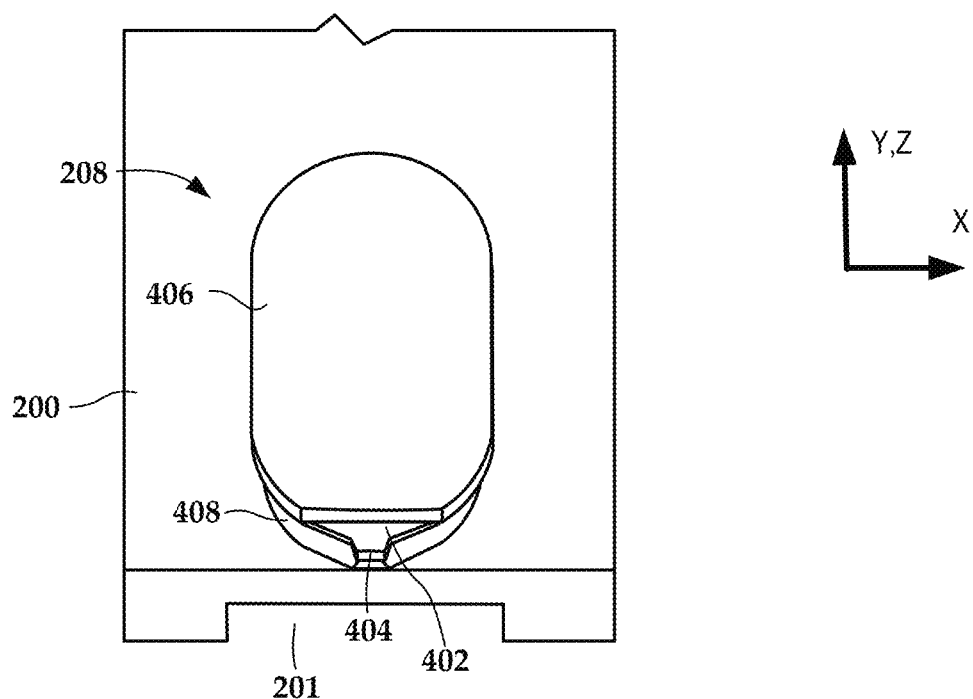
FIG. 4 is a perspective view of a near-field transducer and waveguide of read/write head according to an example embodiment.

In FIG. 4, a perspective view seen from the media-facing surface shows details of the waveguide core 200 and NFT 208 according to an example embodiment. The NFT 208 includes an enlarged part 402 with a peg 404 extending therefrom. The enlarged part 402 receives optical energy from the waveguide core 200 and channels the optical energy via the peg 404 to the recording medium. The enlarged part 402 and peg 404 are made of a plasmonic metal such as Ir, Rh, Au, Pd, Pt, and Os, or alloys thereof. The NFT 208 is sandwiched between a middle disc (MDSC) 406 and a sunken disc (SDSC) 408. The MDSC 406 in this example is made of the same material as the NFT 208, and the SDSC 408 is made of Au or alloys thereof. While the MDSC 406 and SDSC 408 are described as being separate from the NFT 208, they may also be collectively considered a near-field transducer assembly, as the MDSC 406 and SDSC 408 enhance the coupling efficiency of the enlarged part 402 and peg 404, as well as providing other functions, such as heat sinking.

Figure 5:
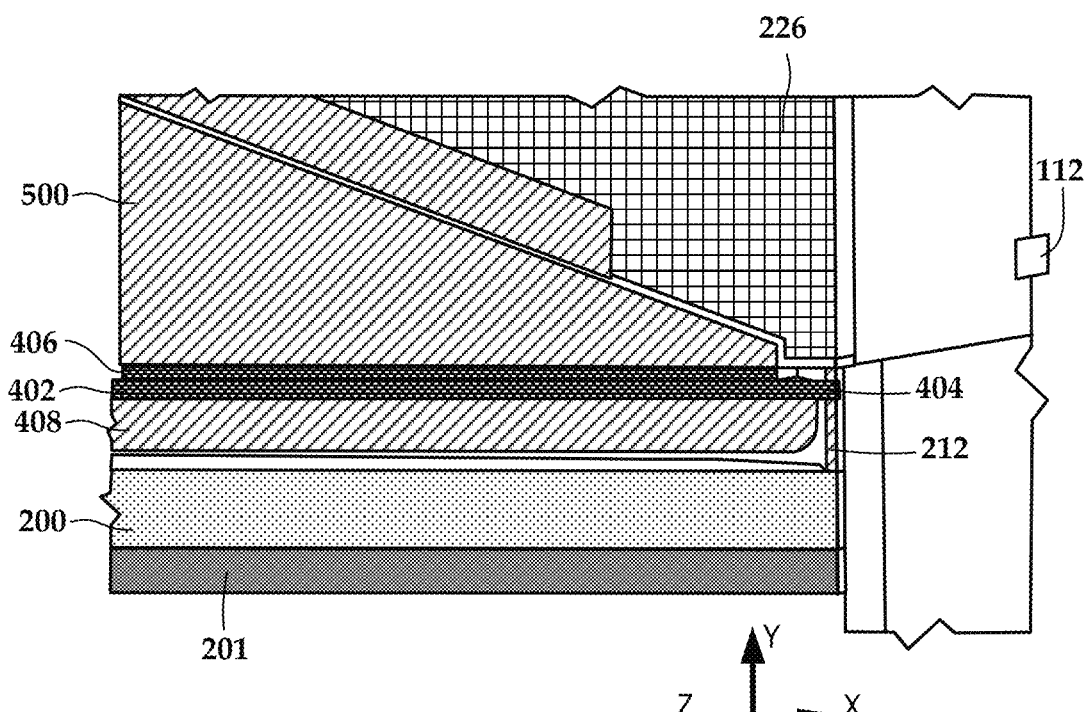
FIG. 5 is a perspective, cross-sectional view of a writer according to an example embodiment.

In FIG. 5, a perspective, cross-sectional view shows additional components of the writer according to an example embodiment. A heat sink disc (HDSC) 500 is located between the MDSC 406 and a write pole 226. The HDSC 500 is formed of a good heat conducting metal, e.g., Au, and the write pole 226 is formed of a ferromagnetic material such as CoFe. Part of the mirror assembly 212 can also be seen in this view.

The core 200 of the waveguide can be formed of a suitable, optical quality dielectric, such as NbOx. Specifically, the core 200 may be formed of a first dielectric material that includes at least one of NbOx, $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon). The core material may be doped to obtain a desired refractive index, which will be different than the refractive index of a cladding (not shown) that surrounds the waveguide.

The hollow 201 of the waveguide core 200 is shown filled with a second dielectric material having a lower refractive index than that of the core 200, such as $SiO_2$, metallic oxides ($Al_2O_3$, AlN), SiOxNy (silicon oxynitride), $MgF_2$, porous $SiO_2$ and porous $Al_2O_3$. This could be a different material than a cladding (not shown) that elsewhere surrounds the core 200, or the same material as the cladding. As shown in FIG. 4, the hollow 201 has a crosstrack width smaller than that of the NFT 208, however the crosstrack width of the hollow 201 may be significantly different than that of the NFT 208 in some embodiments.

In FIGS. 6 and 7, cross-sectional views show waveguide cores 200 with rectangular and trapezoidal hollows 201, respectively. For the purposes of the following discussion, these figures show waveguide geometry which include waveguide height (hWvg) 600, waveguide width (wWvg) 602, hollow height (h) 604, and hollow width (w) 606. The trapezoidal hollow 201 in FIG. 7 has an additional parameter, minimum width ($w_1$) 700 of the hollow 201. For purposes of presenting simulation results, the rectangular hollow is treated as a special case of the trapezoidal hollow, where $w=w_1$.

Generally, the C-shaped waveguide core has been found in simulations to improve NFT excitation efficiency by shaping and pushing the longitudinal field component of the mode (Ez) up to the NFT, mitigating temperatures within the head near the NFT. This waveguide is predicted to cut thermal background from NFT-induced transverse magnetic-(TM) polarization for slight ADC improvement. Other predicted advantages lower GVD (group velocity dispersion) for LPV (laser power variation) and lower attenuation of light propagation along the dielectric waveguide.

Figure 9:
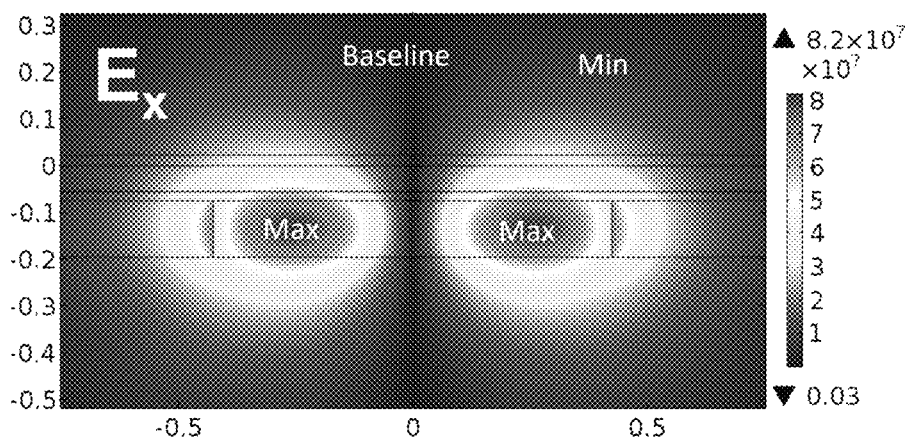
FIGS. 9-14 are plots mode profiles obtained by simulation of a recording head according to example embodiments.
Figure 10:
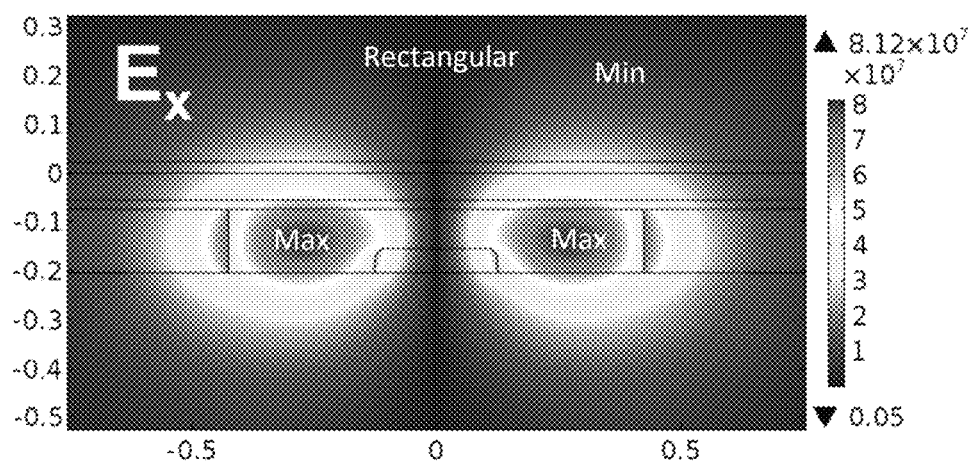
Figure 11:
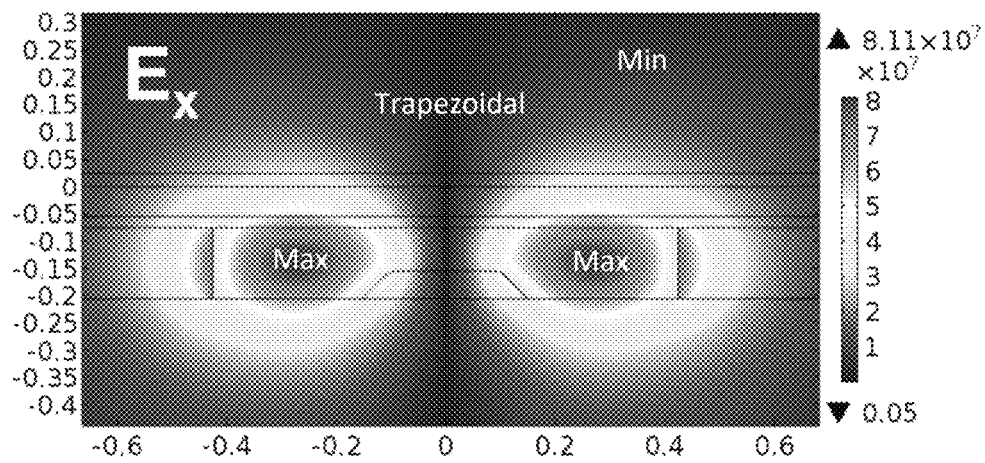
Figure 12:
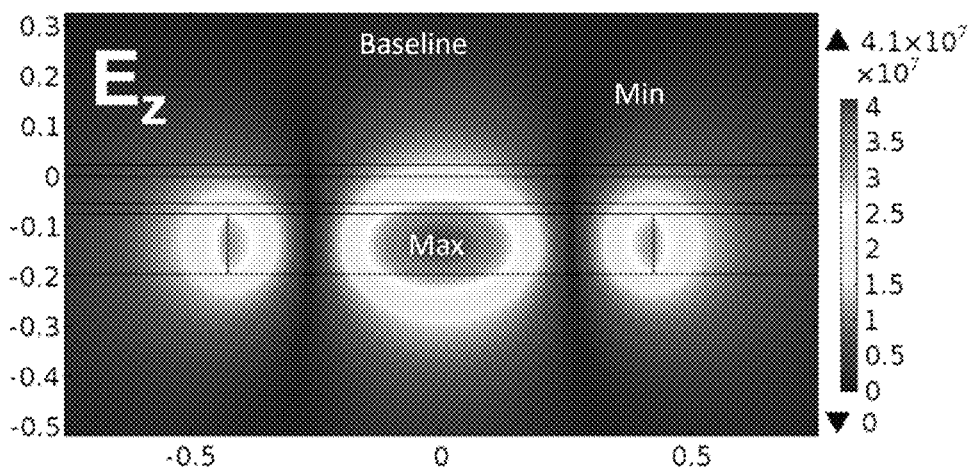
Figure 13:
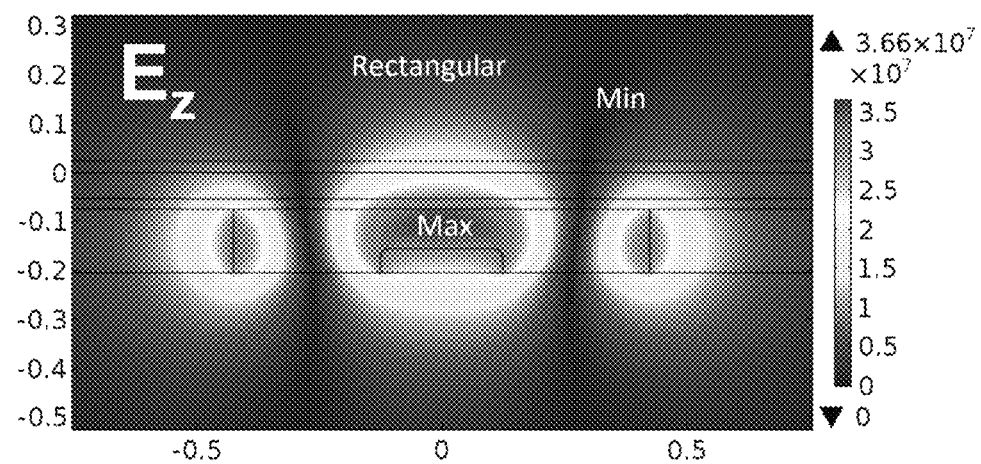
Figure 14:
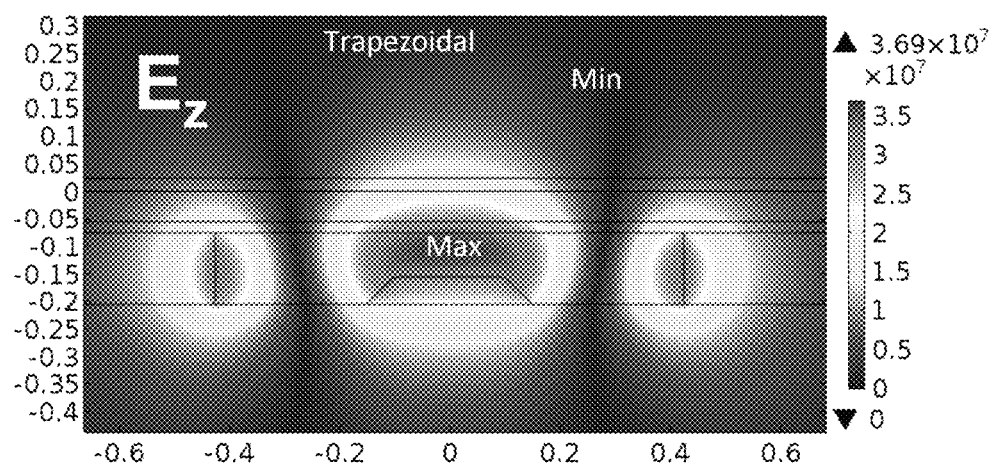

In FIG. 8, a table shows a summary of simulation results for a recording head according to various embodiments. The first row of the table 600 shows baseline results for a rectangular cross sectional waveguide. The second and third rows contain results for rectangular C-shaped section configurations, and the fourth row contains results for a trapezoidal C-shaped section configuration. The column headings include the following results: write-plus-erase width (WPE), downtrack thermal gradient (DT-TG), maximum NFT peg temperature (pegT), maximum SDSC temperature (SDSC_T), maximum write pole temperature (Pole_T), maximum subwavelenth mirror temperature (mSIM_T), optical power flowing in the waveguide at writing condition (CPI), and light absorption in the head (Pabs). In all cases, wWvg=850 nm, and the light wavelength is 830 nm. The NFT material used in the modeling is Ir and includes an Ir MDSC, an Au SDSC, and an NbOx waveguide core. The hollow is filled with dielectric $SiO_2$ In FIGS. 9-14, plots show waveguide $TE_{10}$ mode profiles based on simulations of the baseline configuration and the rectangular C-shaped (w=250 nm, h=50 nm) and trapezoidal C-shaped configurations (w=300 nm, $w_1$=200 nm, h=50 nm). The plots in FIGS. 9-11 are amplitudes of transverse ($E_x$) components, and the plots in FIGS. 12-14 are longitudinal components ($E_z$). The original color plots in FIGS. 9-14 (as well as FIGS. 15-20) are converted to greyscale, thus each of the figures are annotated to indicate the maximum and minimum amplitudes, the values of which are shown in the right hand scale in each figure.

Figure 15:
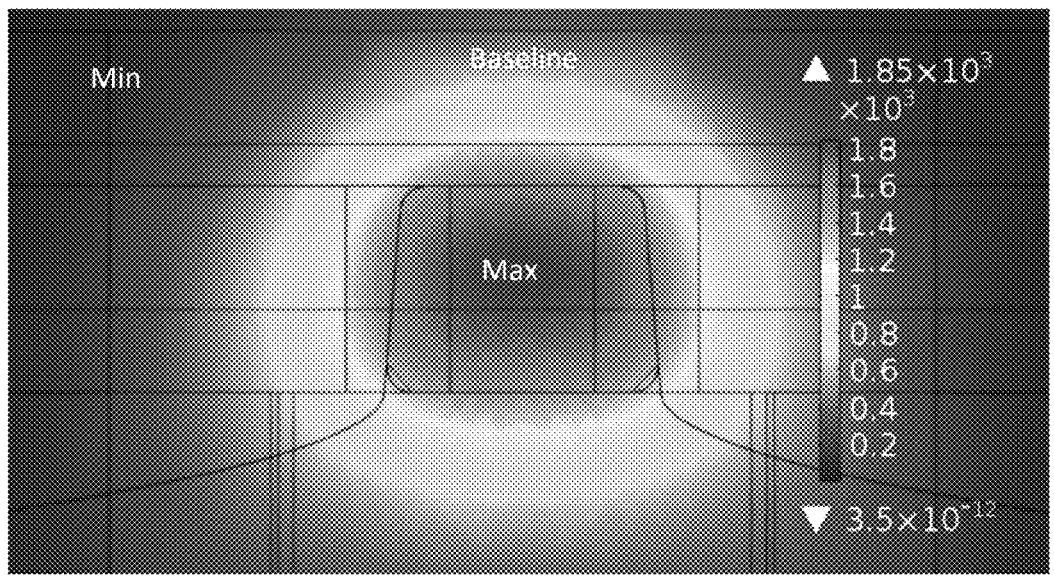
FIGS. 15-20 are plots of absorption and mode profiles obtained by simulation of a recording head and a recording medium according to example embodiments.
Figure 16:
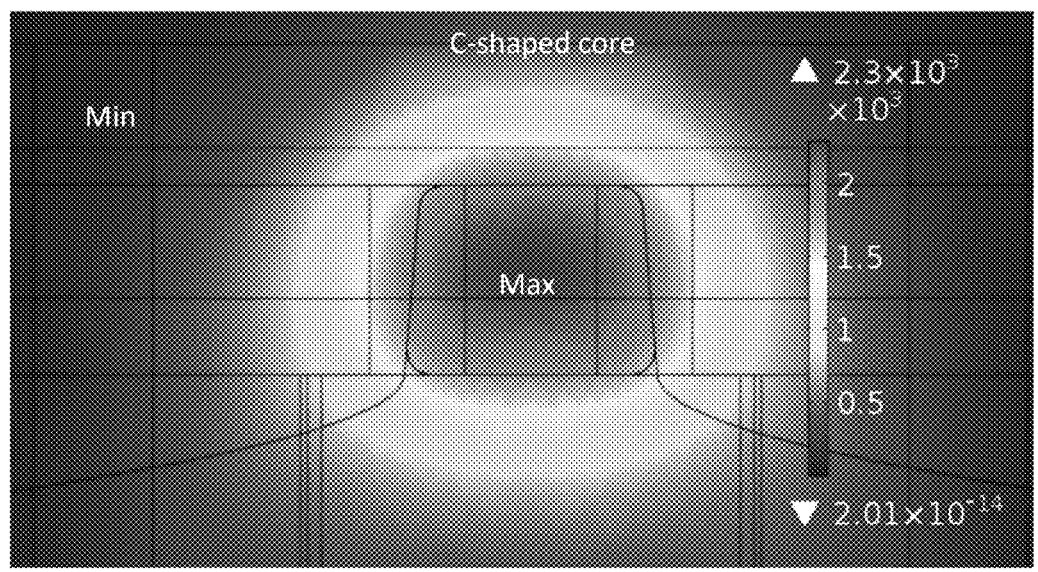
Figure 17:
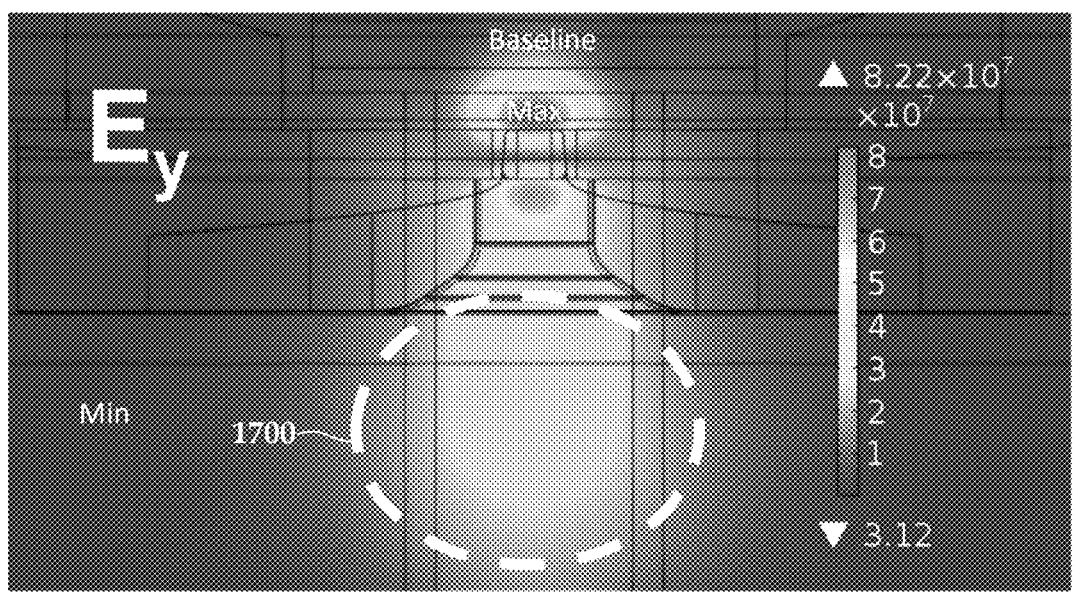
Figure 18:
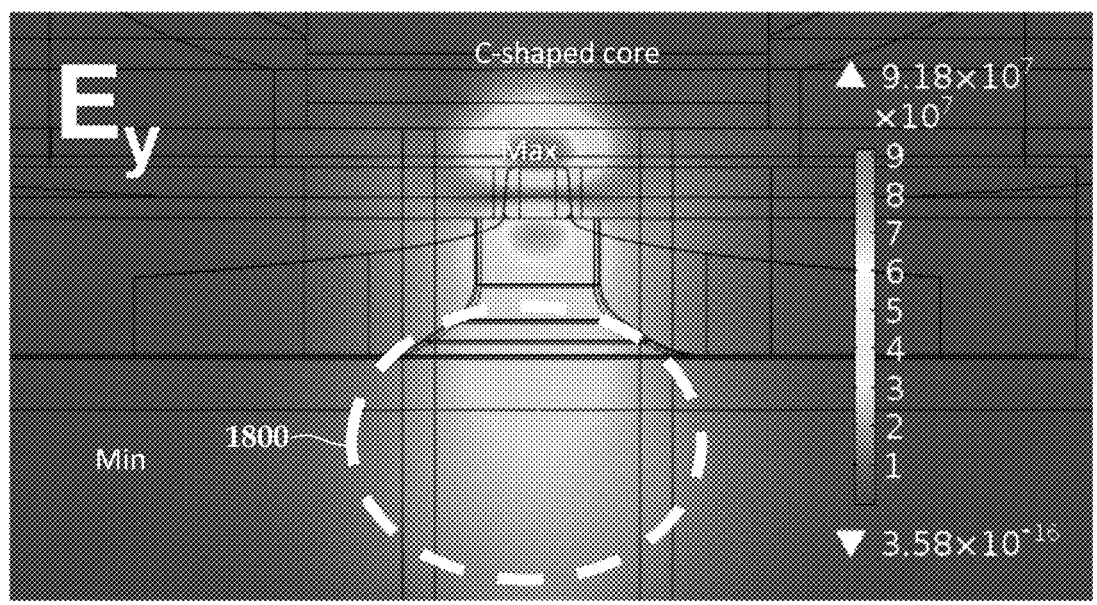

In FIGS. 15-20, plots show addition simulations of the recording medium using a waveguide according to example embodiments. The plots in FIGS. 15 and 16 show a comparison of absorptivity in the middle recording layer between baseline and C-shaped core designs. The peak absorptivity in the middle recording layer is increased by 24%. This is accompanied by CPI/Pabs reduction shown in FIG. 8, which is due to the enhancement of near-field transducer excitation.

Figure 19:
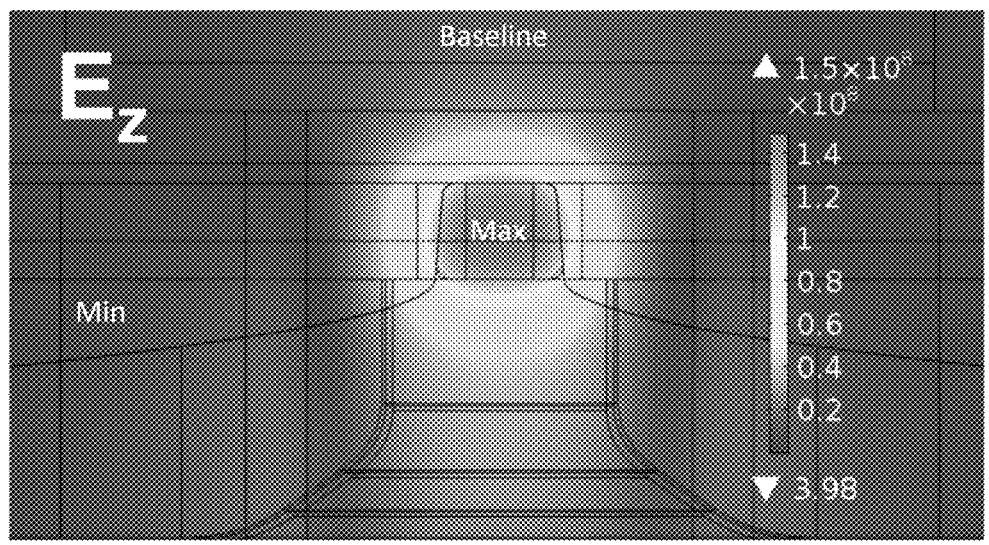
Figure 20:
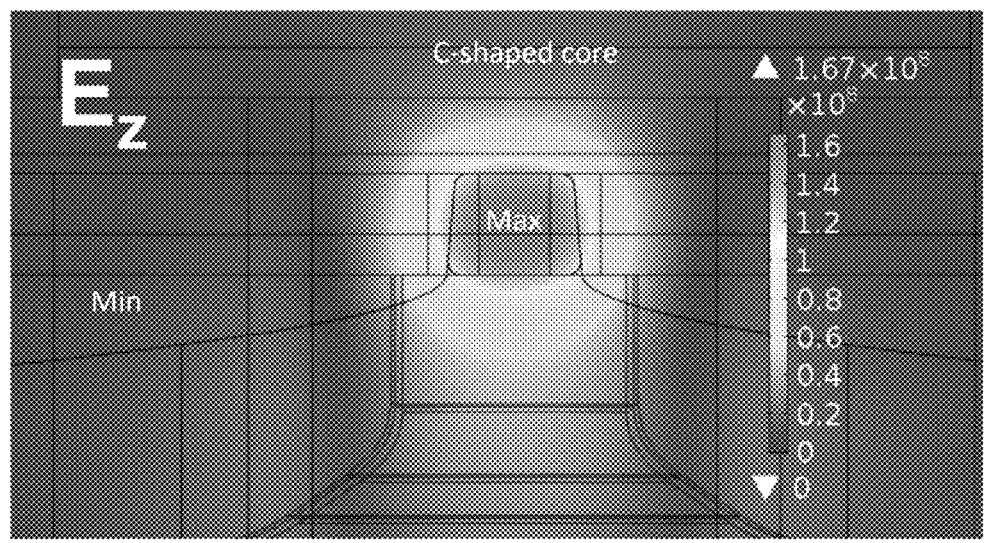

The plots in FIGS. 17-20 show electric field amplitude in the middle recording layer for transverse and longitudinal components ($E_y$, $E_z$). The dashed circles 1700, 1800 are tails of the transverse component, which is mitigated by the C-shaped core. This reduction the size of region excited by transverse electromagnetic energy in the downtrack direction reduces thermal background while recording, leading to an ADC improvement. The C-shaped core also increases the maximum amplitude of the longitudinal components as seen in FIGS. 19 and 20.

Figure 21:
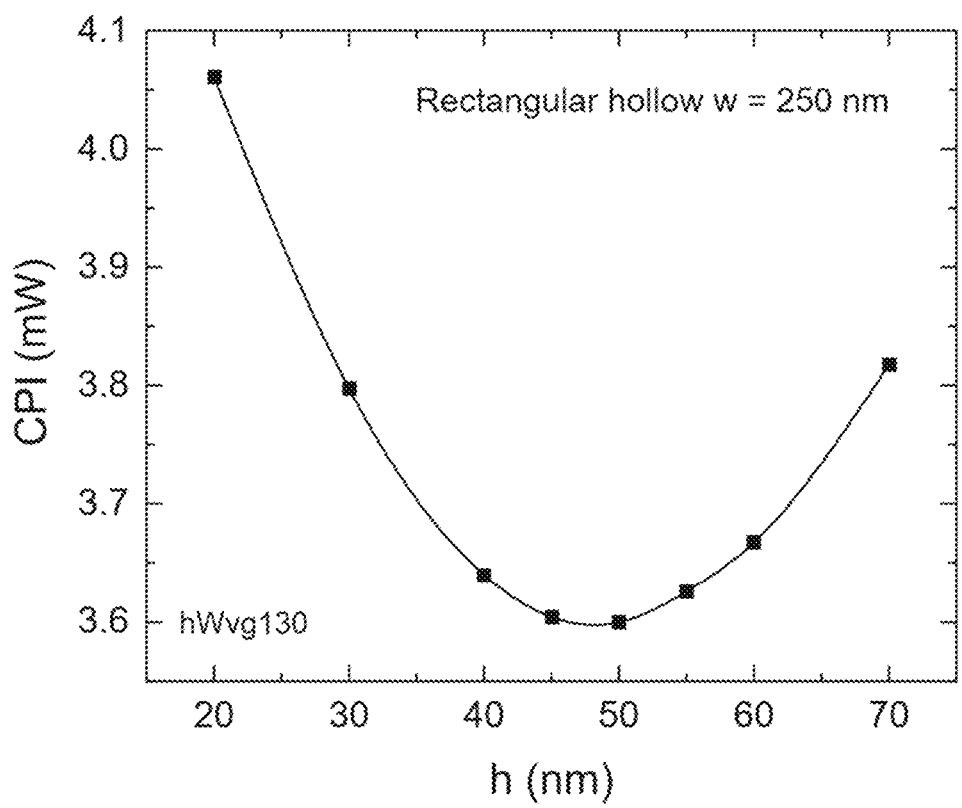
FIGS. 21-23 are plots showing performance and sensitivities of a recording head according to example embodiments.
Figure 22:
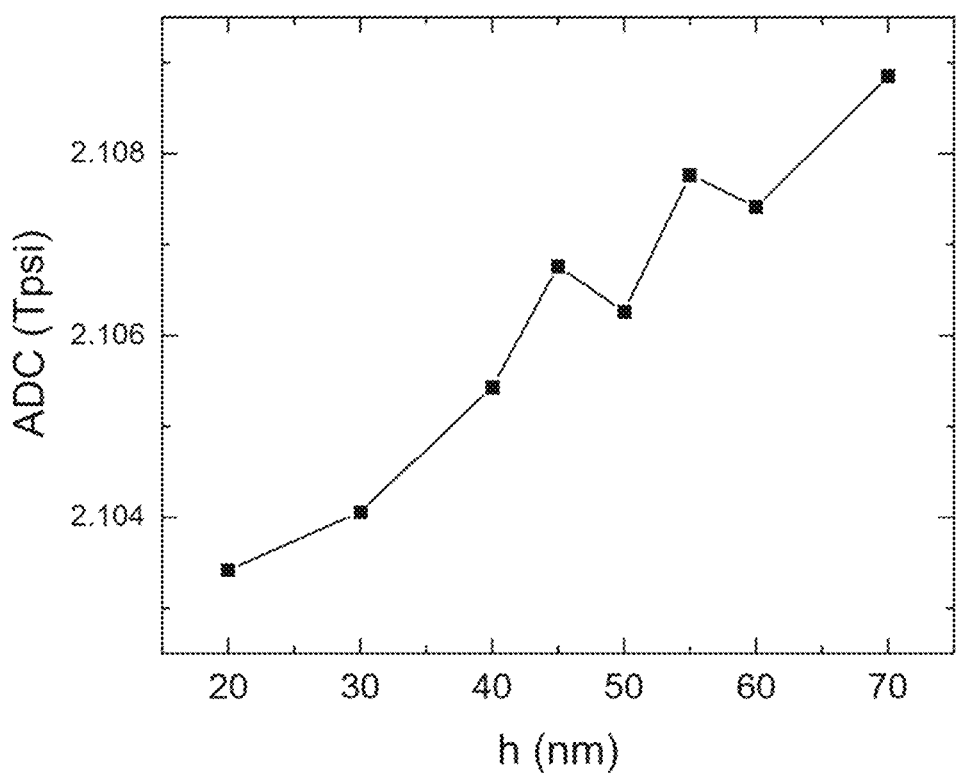

In FIGS. 21 and 22, plots show sensitivity of CPI and ADC to hollow depth h in a recording head according to various embodiments. In FIG. 21, the plot indicates a minimum CPI at around 50 nm. In FIG. 22, the plot indicates ADC increases with h, due to the reduced thermal background from NFT induced TM component. Both of these assume light wavelength of 830 nm, and utilize other NFT and waveguide geometry (e.g., 130 nm×850 nm outer core dimension, rectangular core) used in the simulations described above.

Figures 23, 24:
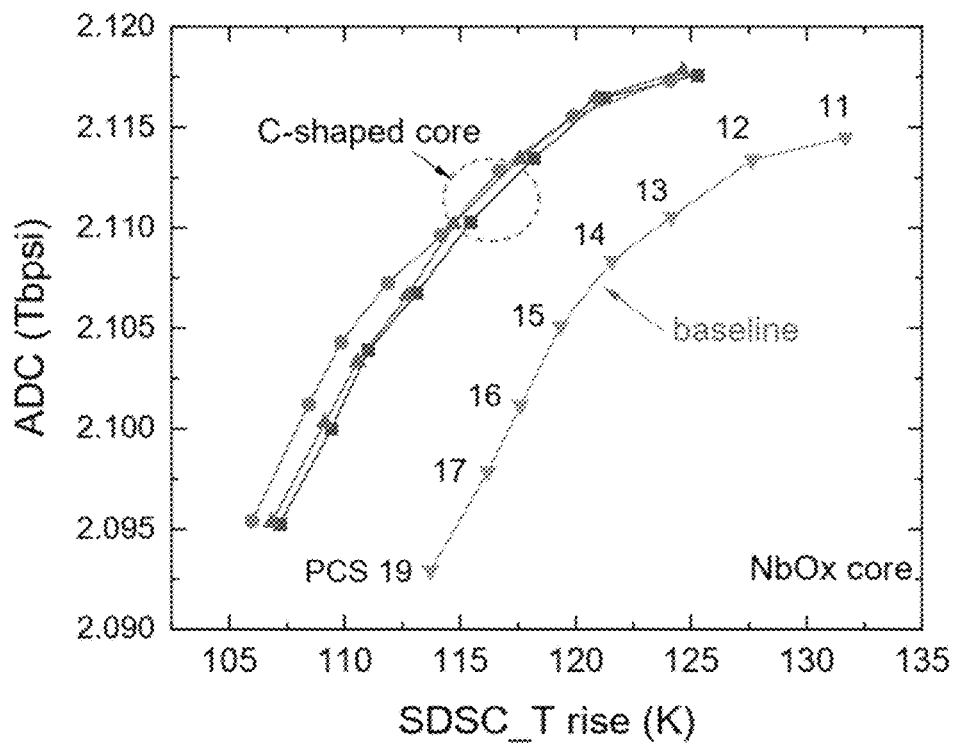
FIG. 24 is a table showing simulation results for a recording head using a 1500 nm light wavelength for excitation according to example embodiments.

In FIG. 23, a plot shows simulation results indicating SDSC temperature rise and ADC for various values of peg-to-coupler spacing (PCS) between 11 and 19 nm. The PCS corresponds to a separation that between the NFT peg and the write pole. A lower PCS generally increases ADC but also increases SDSC temperatures. The plot in FIG. 23 demonstrates that the C-shaped core can provide higher ADC at lower temperatures than the baseline core. The increase in ADC is likely due to due to the reduction in the NFT-induced TM component ($E_y$) shown in FIG. 18.

While the above simulations modeled 830 nm light to excite the NFT, a longer wavelength of around 1500 may also be used for HAMR recording in some embodiments. In FIG. 24, a table shows results for analogous simulations of a recording head with a C-shaped core at 1500 nm. The waveguide outer dimensions are greater (1600 nm×210-220 nm) to facilitate coupling light at this waveguide, however the dimensions of the hollow are unchanged. The results show improvement in CPI and Pabs compared to baseline, although not as much of an improvement over baseline as with 830 nm light.

Unless otherwise indicated, all numbers expressing feature sizes, amounts, and physical properties used in the specification are to be understood as being modified in all instances by the term "about." Accordingly, unless indicated to the contrary, the numerical parameters set forth in the foregoing specification are approximations (e.g., within 10%) that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise. Generally such terms are used herein to describe an orientation shown in the figure, and unless otherwise specified, are not meant to limit orientation of physical embodiments, e.g., relative to the Earth's surface.

What is claimed is:

1. A recording head, comprising:
   a near-field transducer proximate a media-facing surface of the recording head, the near-field transducer comprising a plate-like, enlarged part with a peg extending from the enlarged part; and
   a light delivery waveguide extending from an energy source to the near-field transducer, the light delivery waveguide comprising, proximate the near-field transducer:
      a C-shaped core of a first dielectric material, the C-shaped core having a hollow aligned with the near-field transducer; and
      a cladding of a second dielectric material that surrounds the C-shaped core.

2. The recording head of claim 1, wherein the hollow faces away from the near-field transducer.

3. The recording head of claim 1, wherein the hollow comprises a rectangular hollow.

4. The recording head of claim 1, wherein the hollow comprises a trapezoidal hollow.

5. The recording head of claim 1, wherein an outer shape of the C-shaped core is rectangular.

6. The recording head of claim 1, wherein the first dielectric material comprises one of $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon).

7. The recording head of claim 1, further comprising a write pole, wherein the near-field transducer is located between the write pole and the light delivery waveguide.

8. The recording head of claim 1, further comprising a sunken disc between the enlarged part of the near-field transducer and the C-shaped core.

9. The recording head of claim 1, wherein the C-shaped core reduces a size of a region excited by transverse electromagnetic energy in a downtrack direction, thereby reducing thermal background while recording to a recording medium.

10. A hard disk drive comprising the recording head of claim 1 and a recording medium.

11. A recording head, comprising:
a near-field transducer proximate a media-facing surface of the recording head, the near-field transducer shaping and directing surface plasmons to a recording medium; and
a light delivery waveguide extending from an energy source to the near-field transducer, the light delivery waveguide comprising a C-shaped core of a first dielectric material, the core having a hollow aligned with and proximate the near-field transducer, the hollow facing away from the near-field transducer, the waveguide further comprising a cladding of a second dielectric material that surrounds the C-shaped core.

12. The recording head of claim 11, wherein the hollow comprises a rectangular hollow.

13. The recording head of claim 11, wherein the hollow comprises a trapezoidal hollow.

14. The recording head of claim 11, wherein the hollow extends less than 100 micrometers away from the media-facing surface.

15. The recording head of claim 11, wherein an outer shape of the C-shaped core is rectangular.

16. The recording head of claim 11, wherein the first dielectric material comprises one of $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon).

17. The recording head of claim 11, further comprising a write pole, wherein the near-field transducer is located between the write pole and the light delivery waveguide.

18. The recording head of claim 11, wherein the C-shaped core reduces a size of a region excited by transverse electromagnetic energy in a downtrack direction, thereby reducing thermal background while recording to the recording medium.

19. A hard disk drive comprising the recording head of claim 11 and a recording medium.

* * * * *